Jan. 22, 1946.  H. G. FERGUSON  2,393,358
HITCH MEANS FOR CONNECTING TRAILERS TO TRACTIVE VEHICLES

Original Filed July 31, 1940

Inventor
Henry G. Ferguson
By Jno. Guirie
Atty.

Patented Jan. 22, 1946

2,393,358

UNITED STATES PATENT OFFICE 2,393,358

HITCH MEANS FOR CONNECTING TRAILERS TO TRACTIVE VEHICLES

Henry George Ferguson, Belfast, Northern Ireland

Original application July 31, 1940, Serial No. 348,927. Divided and this application January 14, 1943, Serial No. 472,380. In Great Britain November 25, 1939

4 Claims. (Cl. 280—33.44)

This invention relates to hitch means for connecting unbalanced trailable devices to tractive vehicles and especially for connecting two-wheeled or equivalent non-self-balancing trailers to lightweight agricultural tractors, that is, for trailers or equivalent devices which are not only drawn by the tractive vehicle but are also supported or steadied against tipping thereby.

The present application is a division of my co-pending application, Serial No. 348,927, filed July 31, 1940, and issued as Patent No. 2,347,898 on May 2, 1944.

An object of the invention is to provide a hitch connection for connecting the trailer or equivalent device and tractive vehicle comprising upper and lower link means directed to distribute the unbalanced load or weight of the trailer on to the tractive vehicle as if said load or weight were actually supported forward of the actual connection of the link means to the tractive vehicle and which link means is adapted to allow relative up and down movement between the tractive vehicle and trailer and which is also adapted to cause the trailer together with the link means to swing laterally with reference to the vehicle about or substantially about the centre of the rear axle of the vehicle.

A further object of the invention is to provide a hitch connection comprising laterally spaced links connected at the rear of the vehicle and to the trailer to allow lateral swinging of the links and trailer with reference to the vehicle, the vertical planes respectively containing the connections of the links converging at a point forwardly of the actual connections of the links to the vehicle and preferably at or about the centre of the rear axle thereof.

In order that the nature and objects of the invention will be clearly understood the following specific embodiments as applied to a lightweight Ford-Ferguson tractor will now be described by way of example with reference to the accompanying drawing, in which.

Figure 1:
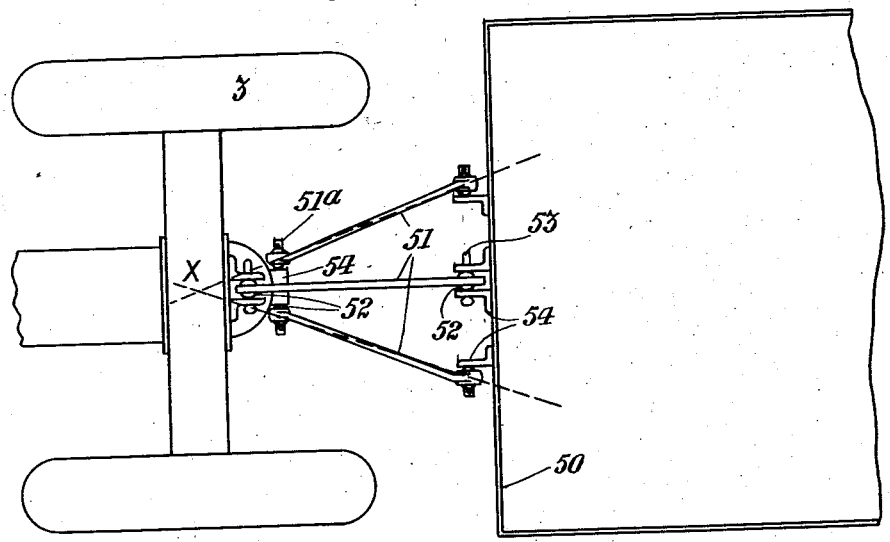
Figure 1 is a generally diagrammatic plan view of a hitch connection embodying the present invention, the rear end portion of the tractor and front end portion of the trailer appearing fragmentarily.
Figure 2:
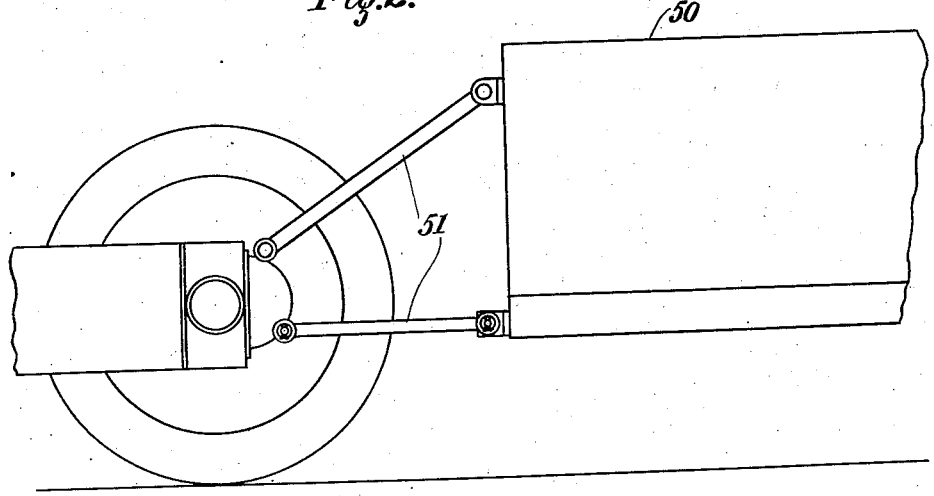
Fig. 2 is a side elevation of the apparatus shown in Fig. 1.

Referring more particularly to the embodiment of the present invention illustrated in Figs. 1 and 2, the trailer there indicated has no tipping platform but simply comprises a load receptacle 50 having two road wheels (not shown) at or near the rear. It is connected to and supported by the rear of the tractor or tractive vehicle by the three links 51 of which the upper is directed so as to transfer the unbalanced trailer weight on to the tractor as described in my previously mentioned co-pending application Serial No. 348,927 filed July 31, 1940 (now Patent No. 2,347,898). The upper link is universally and detachably attached to the tractor and trailer by the balls 52 turnably located in recesses in the ends of the link and engaged by pins 53 which also engage lugs or brackets 54 on the tractor and trailer. The lower links are similarly universally attached to the trailer and also universally attached to the cross shaft 51a at the extreme rear of the tractor. It will be noted that with the trailer centrally behind the tractor as shown in Fig. 1, the vertical planes passing through the joint centres as indicated by the dotted lines converge on a vertical line passing through the central point X of the rear axle of the tractor. The effect of this feature will be described later. The lower links are relatively close at their forward ends and this, coupled with the fact that they are attached at the extreme rear of the tractor, permits a substantial angle of turning of the trailer with reference to the tractor.

At present the most usual practice in attaching trailers to tractors or other tractive vehicles is to attach the drawbar at the rear of the vehicle. This is the most convenient arrangement from the mechanical point of view but it has defects in the case of high speed traction.

The point of attachment is of necessity behind the axis of the rear driving wheels and consequently any lateral force applied at that point tends to turn the vehicle about the centre of the rear axle and cause a lateral force in the opposite direction on the front steering wheels. The trailer can cause the application of such lateral force by lateral oscillations of the trailer, by centrifugal action during turning or by braking action causing the trailer to thrust on the tractive vehicle. The first cause may be especially dangerous if a periodic, cumulative oscillation is set up. In any case the resultant lateral drag on the steering is dangerous in the case of highway traction at speed and may give rise to accidents.

The ideal point for attachment of the drawbar is on a vertical axis passing through the centre of the axis of the rear wheels. With such an arrangement it is obvious that the trailer cannot apply to the tractive vehicle a force creating a lateral turning moment about the centre of the rear axis and a corresponding drag on the steering. However, it is sometimes not mechanically convenient to attach the drawbar in this manner.

With the arrangements shown in Figs. 1 and 2 the links 51 are attached at the rear, which is the most convenient arrangement from the mechanical point of view, but the effect of these converging links is such that the trailer behaves as if actually connected at the point of intersection X on the vertical line passing through the centre of the rear wheel axis.

If, for example, the front end of the trailer tends to swing to the right, the left hand link 51 will exert a thrust on the tractor passing through the point X and the right hand link 51 will exert an equal pull passing through this point and it will be obvious that neither of these forces will exert a turning moment on the tractor about the point X so that there will be no lateral drag on the steering. It will also be understood that the resultant turning moment about any point on the rear axis will be zero. When the trailer has swung to one side relatively to the tractor, as in turning, the point X swings round a curved path to the other side but in this case the opposite moments of the forces in the links about the vertical line containing the centre of the rear axis substantially cancel each other so that the resultant moment and drag on the steering is substantially zero.

In as much as the trailer connected by the converging linkage does not impose lateral drag on the steering it will be understood that the converse applies, namely that it does not materially impede steering of the tractor which can turn relatively to the trailer about the vertical line containing the point of convergence.

It will also be understood that the double link arrangement tends to prevent oscillations of a two-wheeled trailer about the centre of its wheel axis. Such oscillations can readily occur with a single drawbar.

I claim:

1. In combination a non-self-balancing trailable device including ground-engaging means and having the resultant of its downwardly acting weight or load in front of said means, a tractive vehicle including front steering ground wheel means and rear ground wheel means, and a hitch connection for connecting the tractive vehicle and trailable device comprising upper and lower link means respectively under compression and tension due to said weight or load and connection means on the tractive vehicle behind the axis of the rear wheel means and on the trailable device for pivotal connection of the said upper and lower link means to allow relative up and down movement between the tractive vehicle and trailable device and to allow lateral swinging of the device with reference to the tractive vehicle, said connection means being so spaced that transverse planes respectively containing the connection means of the upper and lower link means meet forward of the axis of said rear wheel means and at least one of said link means comprising laterally spaced links with their connection means so spaced that vertical planes containing the connection means of the respective links normally meet at or near the centre of the axis of the rear ground wheel means.

2. In a trailer attachment for a tractive vehicle including front steering wheels and rear wheels, the combination of a non-self-balancing trailer having ground wheels and having the resultant of its downwardly acting weight or load in front of said ground wheels, and a hitch connection adapted to join the vehicle and trailer comprising upper link means and lower link means and connection means adapted to be mounted on the vehicle behind the axis of the rear wheels and on the trailer for universally connecting the link means to the vehicle and trailer, said connection means being so spaced that the connection means for the upper and lower link means respectively lie in transverse planes which converge forward of the axis of the rear wheels of the vehicle and at least one of said link means comprising two laterally spaced links of which the connection means are so laterally spaced that vertical planes passing through said lastmentioned connection means normally converge at or near the centre of the axis of the rear wheels of the vehicle.

3. The combination as claimed in claim 2, in which said link means comprises an upper compression link and said lower link means comprises two separate laterally spaced links, and connection means for said upper and lower links respectively lying in transverse plane which converge between the axes of the front and rear wheels of the vehicle.

4. The combination as claimed in claim 2, in which said link means comprises an upper compression link and said lower link means comprises two separate laterally spaced links, the connection means for said upper and lower links respectively lying in transverse planes which converge within vertical planes passing through the axes of the front and rear wheels of the vehicle and in which each connection means for the links comprises a joint including universally jointed elements and triangularly spaced attachment means on the vehicle and trailer for attachment to an element of each joint.

HENRY GEORGE FERGUSON.